US012515829B2

(12) United States Patent
Calvin

(10) Patent No.: US 12,515,829 B2
(45) Date of Patent: Jan. 6, 2026

(54) MEDICATION TRACKING SYSTEM IN A PHARMACY

(71) Applicant: Express Scripts Strategic Development, Inc., St. Louis, MO (US)

(72) Inventor: Kristine Calvin, Troy, IL (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 172 days.

(21) Appl. No.: 18/541,295

(22) Filed: Dec. 15, 2023

(65) Prior Publication Data

US 2025/0195334 A1 Jun. 19, 2025

(51) Int. Cl.

*A47F 1/04* (2006.01)
*B65B 3/00* (2006.01)
*B65B 57/10* (2006.01)
*A47F 10/00* (2006.01)

(52) U.S. Cl.

CPC ................ *B65B 3/003* (2013.01); *A47F 1/04* (2013.01); *B65B 57/10* (2013.01); *A47F 2010/005* (2013.01); *A61J 2200/70* (2013.01); *A61J 2205/60* (2013.01)

(58) Field of Classification Search

CPC ... A47F 1/04; A47F 2010/005; A61J 2200/70; A61J 2205/60; B65B 3/003; B65B 57/10
See application file for complete search history.

(56) References Cited

U.S. PATENT DOCUMENTS

| | | | | |
|---|---|---|---|---|
| 6,935,560 B2 * | 8/2005 | Andreasson | G16H 40/20 235/382 |
| 7,158,030 B2 * | 1/2007 | Chung | H01Q 7/00 340/5.1 |
| 7,747,477 B1 * | 6/2010 | Louie | G07G 1/009 705/28 |
| 8,060,246 B2 * | 11/2011 | Berg | G07F 11/54 221/124 |
| 8,251,629 B2 * | 8/2012 | Schifman | G07F 17/0092 340/568.1 |
| 9,492,355 B2 * | 11/2016 | Ratnakar | G16H 20/13 |
| 9,665,688 B2 * | 5/2017 | Terzini | G16H 20/13 |
| 10,377,623 B2 * | 8/2019 | Arcand | B67D 7/3281 |
| 10,545,044 B2 * | 1/2020 | Wegelin | A47K 5/12 |
| 10,583,941 B2 * | 3/2020 | Holmes | B65B 57/20 |
| 10,998,094 B1 * | 5/2021 | Chiu | G16H 20/13 |
| 11,244,747 B2 * | 2/2022 | Louie | G16H 20/10 |
| 11,364,624 B2 * | 6/2022 | Hoffman | G16H 20/13 |

(Continued)

*Primary Examiner* — Nicolas A Arnett
(74) *Attorney, Agent, or Firm* — Dickinson Wright PLLC

(57) ABSTRACT

A medication filling system includes at least one automatic dispensing device with a plurality of cells that contain a plurality of different types of medications for dispensing into prescription containers. The medication filling system also includes a bulk and prep area that has a plurality of bulk up containers with medications to refill the plurality of cells in the automatic dispensing device. The bulk up containers include wireless tags with data that includes at least the type and quantity of the medications contained in the respective bulk up containers. At least one wireless sensor is positioned at an opening between the bulk and prep area and the at least one automatic dispensing device. The at least one wireless sensor is configured to monitor each time one of the bulk up containers passes through the opening into or out of the bulk and prep area.

11 Claims, 10 Drawing Sheets

(56) References Cited

U.S. PATENT DOCUMENTS

| | | | | |
|---|---|---|---|---|
| 11,389,378 | B1 * | 7/2022 | Calvin | G06K 7/1417 |
| 11,396,447 | B1 * | 7/2022 | Mortimer | B67D 7/0288 |
| 11,430,554 | B2 * | 8/2022 | Louie | G06Q 10/087 |
| 11,462,312 | B1 * | 10/2022 | Rogers | A61J 1/03 |
| 11,505,355 | B2 * | 11/2022 | Hoffman | A61J 1/00 |
| 11,557,393 | B2 * | 1/2023 | Gitchell | G16Z 99/00 |
| 11,633,331 | B2 * | 4/2023 | Calvin | G06K 7/1417 221/13 |
| 11,772,838 | B1 * | 10/2023 | Hoffman | B65B 69/0033 53/492 |
| 11,783,273 | B1 * | 10/2023 | Ciliberti | G06Q 10/0833 705/332 |
| 11,844,751 | B2 * | 12/2023 | Calvin | A61J 7/0076 |
| 12,046,342 | B2 * | 7/2024 | Louie | G16H 20/13 |
| 12,133,833 | B2 * | 11/2024 | Calvin | G16H 40/63 |
| 12,157,662 | B2 * | 12/2024 | Mortimer | G07F 17/0092 |
| 2010/0161345 | A1 * | 6/2010 | Cain | G16H 40/20 705/28 |
| 2013/0000260 | A1 * | 1/2013 | Mcerlean | G16H 70/40 53/492 |
| 2013/0151003 | A1 * | 6/2013 | Gillum | G06Q 40/00 705/2 |
| 2014/0032123 | A1 * | 1/2014 | Klein | G16H 10/60 702/19 |
| 2014/0157731 | A1 * | 6/2014 | Perazzo | B65B 3/003 141/2 |
| 2014/0353332 | A1 * | 12/2014 | Wegelin | B67D 1/0078 222/23 |
| 2015/0257977 | A1 * | 9/2015 | Bochenko | A61J 1/201 604/404 |
| 2016/0042150 | A1 * | 2/2016 | Moloughney | G16H 20/13 700/237 |
| 2016/0376073 | A1 * | 12/2016 | Douglas | B65D 47/127 222/1 |
| 2021/0078747 | A1 * | 3/2021 | Hoffman | A61J 1/00 |
| 2021/0282311 | A1 * | 9/2021 | Wintemute | A01C 7/10 |
| 2022/0142037 | A1 * | 5/2022 | Wintemute | A01M 9/0092 |
| 2023/0153743 | A1 * | 5/2023 | Kaneria | G06Q 10/0832 705/332 |

* cited by examiner

MEDICATION TRACKING SYSTEM IN A PHARMACY

BACKGROUND

1. Field

The present disclosure is related generally to pharmacies and, more particularly, to systems for tracking the movement of medications within a pharmacy.

2. Related Art

Many high-volume pharmacies include one or more automatic dispensing devices that are configured to automatically dispense medications into respective containers, such as bottles. These automatic dispensing devices hold large quantities of different medications in a plurality of cells. The cells periodically need to be refilled with medications prior to emptying.

SUMMARY

One aspect of the present disclosure is related to a medication filling system. The medication filling system includes at least one automatic dispensing device with a plurality of cells that contain a plurality of different types of medications. The at least one automatic dispensing device is configured to dispense the medications into prescription containers. The medication filling system also includes a bulk and prep area that has a plurality of bulk up containers with medications to refill the plurality of cells in the automatic dispensing device. The bulk up containers include wireless tags with data that includes at least the type and quantity of the medications contained in the respective bulk up containers. At least one wireless sensor is positioned at an opening between the bulk and prep area and the at least one automatic dispensing device. The at least one wireless sensor is configured to monitor each time one of the bulk up containers passes between two distinct areas of the pharmacy, e.g., through the opening into or out of the bulk and prep area.

According to another aspect of the present disclosure, at least one wireless sensor is positioned at every opening into the bulk and prep area or entry into the dispensing area or at a boundary between two areas in the pharmacy.

According to yet another aspect of the present disclosure, the medication filling system further includes a portable technician device with a wireless sensor. The technician device is configured to sense the wireless tag of a selected one of the bulk up containers and to guide a technician towards the selected one of the bulk up containers.

According to still another aspect of the present disclosure, the plurality of different types of medications are a plurality of different types of pills.

Another aspect of the present disclosure is related to a method of refilling a medication filling system. The method includes the step of preparing at least one automatic dispensing device that includes a plurality of cells containing a plurality of different types of medications. The at least one automatic dispensing device is configured to dispense the medications into prescription containers. The method continues with the step of receiving a notification on a technician device that a selected cell of the plurality of cells requires a refill of a selected medication contained therein. The method proceeds with the step of receiving, with the technician device, a signal from a wireless tag on a selected bulk up container that contains the selected medication to refill the selected cell. The method continues with the step of displaying on a technician device continuously updated directions to the selected bulk up container.

According to another aspect of the present disclosure, the continuously updated directions include an arrow pointing towards the selected bulk up container and a distance from the technician device to the selected bulk up container.

According to yet another aspect of the present disclosure, the selected bulk up container is one of a plurality of bulk up containers that are located in a bulk and prep area that is adjacent the at least one automatic dispensing device.

According to still another aspect of the present disclosure, at least one wireless sensor is located between the bulk and prep area and the at least one automatic dispensing device.

According to a further aspect of the present disclosure, the method further includes the step of, with the at least one wireless sensor, detecting an improper removal of at least one of the plurality of bulk up containers from the bulk and prep area.

According to yet a further aspect of the present disclosure, the method further includes the step of alerting the technician device in response to the detection of the improper removal of at least one of the plurality of bulk up containers from the bulk and prep area.

According to still a further aspect of the present disclosure, the method further includes the step of transferring the selected medication from the selected bulk up container to a temporary container.

According to another aspect of the present disclosure, the method further includes the step of removing the temporary container with the selected medication contained therein from the bulk and prep area while the selected bulk up container remains in the bulk and prep area.

According to yet another aspect of the present disclosure, the method further includes the step of refilling the selected cell with the selected medication contained in the temporary container.

Yet another aspect of the present disclosure is related to a method of operating a medication filling system. The method includes the step of providing a medication filling area that includes a plurality of automatic dispensing devices. At least one of the automatic dispensing devices has a plurality of cells that contain different medications. The method continues with the step of providing a bulk and prep area that includes a plurality of bulk up containers that contain different medications that correspond with the medications within the plurality of cells of the plurality of automatic dispensing devices. The method proceeds with the step of receiving a notification on a technician device that a selected cell of the plurality of cells requires refilling with a selected medication. The method continues with the step of transmitting a notification to a technician device that identifies the selected cell that requires refilling and also identifies a selected bulk up container that contains the selected medication. The method proceeds with the step of receiving a signal from a wireless tag on the selected container that directs a technician using the technician device on a location of the selected bulk up container.

According to another aspect of the present disclosure, at least one wireless sensor is positioned between the bulk and prep area and the medication filling area.

According to yet another aspect of the present disclosure, the method further includes the step of, with the at least one RFID sensor, detecting an improper removal of at least one of the plurality of bulk up containers from the bulk and prep area.

According to still another aspect of the present disclosure, the method further includes the step of alerting the technician device in response to the detection of the improper removal of at least one of the plurality of bulk up containers from the bulk and prep area.

According to a further aspect of the present disclosure, the method further includes the step of transferring the selected medication from the selected bulk up container to a temporary container.

According to yet a further aspect of the present disclosure, the method further includes the step of removing the temporary container with the selected medication contained therein from the bulk and prep area while the selected bulk up container remains in the bulk and prep area.

According to still another aspect of the present disclosure, the method further includes the step of refilling the selected cell with the selected medication contained in the temporary container.

BRIEF DESCRIPTION OF THE DRAWINGS

These and other features and advantages of the invention will become more readily appreciated when considered in connection with the following description of the presently preferred embodiments, appended claims and accompanying drawings, in which:

DESCRIPTION OF THE ENABLING EMBODIMENT

As discussed in further detail herein, the subject disclosure is related to a medication tracking system for use in a pharmacy. When a cell in an automated dispensing device is low or empty of medication, a technician is instructed to refill that cell. The technician will go to a medication storage area in the pharmacy to retrieve additional product. In some cases, the technician will find that the container they are looking for (i.e., the container that contains the medication in the cell to be refilled) is not in its designated location. This can delay the refill process while the technician either looks for the appropriate container or just chooses a different container, which may have a later expiration date than the container that the technician was searching for. This frequently leads to wasted product if the missing container cannot be found prior to expiration of the medications contained therein.

The medication tracking system includes remotely sensible and readable codes, e.g., radio frequency identification (RFID) tags, Bluetooth tags, ultrawideband tags, WiFi tags, or the like. The codes are positioned on a plurality of bulk up containers that are stored in a bulk and prep area of a pharmacy, such as a high-volume pharmacy. As discussed in further detail below, the presence of the codes on the bulk up containers reduces waste and lost technician time by making it significantly easier to find bulk up containers within the bulk and prep area and also by raising alarms if any bulk up containers are mistakenly removed from the bulk and prep area. These features are discussed in further detail below. In some cases, the code can include an optical code, which requires a line of sight (e.g., a barcode or a QR code) between a scanner and the code, and a non-optical code (e.g., an RFID tag or a Bluetooth tag, etc.) that does not require a line of sight between the scanner and the code. In the following embodiments, the code is an RFID tag. However, it should be appreciated that any of the above or any other suitable type of code can be employed in other embodiments. The RFID scanners can sense multiple RFID tags at once, which can help streamline operations.

Figure 1:
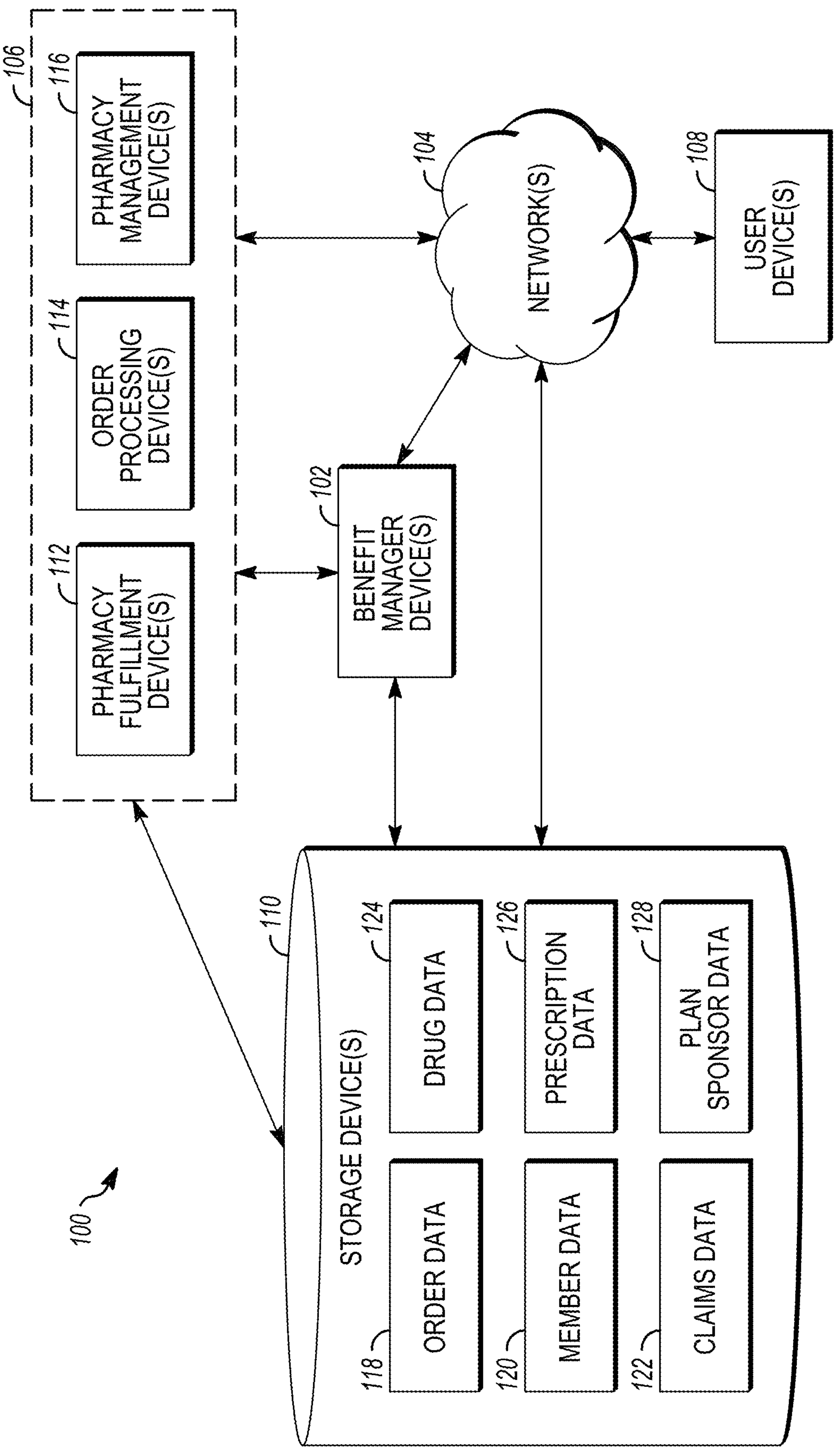
FIG. 1 is a block diagram of an example system according to an example embodiment.

FIG. 1 is a block diagram of an example implementation of a system 100, according to an example embodiment. While the system 100 is generally described as being deployed in a high-volume pharmacy or fulfillment center (e.g., a mail order pharmacy, a direct delivery pharmacy, an automated pharmacy, multiple package delivering center, and the like), the system 100 and/or components thereof may otherwise be deployed (e.g., in a lower volume pharmacy). A high-volume pharmacy may be a pharmacy that is capable of filling prescriptions automatically, mechanically, manually, or a combination thereof. The system 100 may include a benefit manager device 102, a pharmacy device 106, and a user device 108, which may communicate with each other directly and/or over a network 104. The system may also include a storage device 110.

The benefit manager 102 is a device operated by an entity that is at least partially responsible for creation and/or management of the pharmacy or drug benefit. While such an entity operating the benefit manager device 102 is typically a pharmacy benefit manager (PBM), other entities may operate the benefit manager device 102 either on behalf of themselves, the PBM, another entity, or other entities. For example, the benefit manager device 102 may be operated by a health plan, a retail pharmacy chain, a drug wholesaler, a data analytics or other type of software-related company, or the like. In some embodiments, a PBM that provides the pharmacy benefit may also provide one or more than one additional benefits including a medical or health benefit, a dental benefit, a vision benefit, a wellness benefit, a radiology benefit, a pet care benefit, an insurance benefit, a long term care benefit, a nursing home benefit, and the like. The PBM may, in addition to its PBM operations, operate one or more than one pharmacy. The pharmaceutical vending machines or kiosks, and the like.

Some of the operations of the PBM that operates the benefit manager device 102 may include the following activities and processes. A member (or a person on behalf of the member) of a pharmacy benefit plan administered by or through the PBM attempts to obtain a prescription drug at a retail pharmacy location (e.g., a location of a physical store) from a pharmacist or a pharmacist technician. The member may also attempt to obtain the prescription drug through mail order drug delivery from a mail order pharmacy location, which may be the high-volume pharmacy system 100. In some embodiments, the member may also attempt to obtain the prescription drug directly or indirectly through the use of a machine, such as a kiosk, vending unit, mobile electronic device, or a different type of mechanical electrical, electronic communication device, and/or computing device. Such a machine may be filled with the prescription drug in prescription packaging, which may include multiple prescription components, by the high-volume pharmacy system 100.

The member may have a copayment for the prescription drug that reflects an amount of money that the member is responsible to pay the pharmacy for the prescription drug. The money paid by the member to the pharmacy may come from personal funds of the member, a health savings account (HAS) of the member or the member's family, a health reimbursement arrangement (HRA) of the member or the member's family, a flexible spending account (FSA) of the member or the member's family, or the like. In some instances, an employer of the member may directly or indirectly fund or reimburse the member for the copayments.

The amount of the co-pay required form the member may vary with different pharmacy benefit plans having different plan sponsors or clients and/or prescription drugs. The member's copayment may be based on a flat copayment (e.g., $10), co-insurance (e.g., 10%), and/or a deductible (e.g., for first $500 of annual prescription drug expenses) for certain prescription drugs, certain types and/or classes of prescription drugs, and/or all prescription drugs. The copayment may be stored in the storage 110 or determined by the benefit manager device 102.

In some instances, the member may not pay the copayment or may only pay a portion of the copayment for the prescription drug. For example, if the usual and customary cost for a generic version of a prescription drug is $4, and the member's flat copayment is $20 for the prescription drug, the member may only be required to pay $4 to receive the prescription drug. In another example involving a worker's compensation claim. No copayment may be due by the member for the prescription drug.

In addition, copayments may also vary based on different delivery channels used for the prescription drug to be received by the member. For example, the copayment for receiving the prescription drug from a mail order pharmacy location may be less than the copayment for receiving the prescription drug from a retail pharmacy location.

In conjunction with receiving the copayment (if any) from the member and dispensing the prescription drug to the member, the pharmacy submits a claim to the PBM for the prescription drug. After receiving the PBM (e.g., through the benefit manager device 102) may perform certain adjudication operations including verifying eligibility of the member, identifying and/or reviewing an applicable formulary for the member to determine any appropriate copayment, coinsurance, and deductible for the prescription drug, and performing a drug utilization review (DUR) on the member. The PBM provides a response to the pharmacy (e.g., from the benefit manager device 102 to the pharmacy device 106) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated.

The aforementioned adjudication operations generally occur before the copayment is received and the prescription drug is dispensed. However, in some instances these operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be determined at least partially based on the type(s) of pharmacy network in which the pharmacy is included. Other factors may also be used to determine the amount in addition to the type of pharmacy network. For example, if the member pays the pharmacy for the prescription drug without the prescription drug benefit provided by the PBM (e.g., by paying cash without use of the prescription drug benefit or by use of a so-called pharmacy discount card offering other negotiated rates), the amount of money paid by the member may be different than when the member uses prescription or drug benefit. In some embodiments, the amount of money received by the pharmacy for dispensing the prescription drug and for the prescription drug itself may be higher than when the member uses the prescription or drug benefit. Some or all of the foregoing operations may be performed by executing instructions stored on the benefit manager device 102 and/or an additional device.

Examples of the network 104 include Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. The network 104 may include an optical network. The network 104 may be a local area network or a global communication network, such as the Internet. In some embodiments, the network 104 may include a network dedicated to prescription e-orders, e.g., a prescribing network such as the electronic prescribing network operated by Surescripts of Arlington, Virginia.

Moreover, although the system shows a single network 104, multiple networks can be used. The multiple networks may communicate in series with each other to link the devices 102, 106-110 or in parallel to link the devices 102, 106-110.

The pharmacy device 106 may include an order processing device 114, a pharmacy manager device 116, and a pharmacy fulfillment device 112 in communication with each other directly and/or over the network 104.

The order processing device 114 may receive information regarding filling prescriptions and may direct an order component to one or more than one of the devices of the pharmacy fulfillment device 112 at a pharmacy. The pharmacy fulfillment device 112 may fulfill, dispense, aggregate, and/or pack the order components of the prescription drugs in accordance with one or more than one of the prescription orders directed by the order processing device 114. The order processing device 114 may be deployed in the system 100, or may otherwise be used.

In general, the order processing device 114 is a device located within or otherwise associated with the pharmacy to enable fulfillment of a prescription and dispensing prescription drugs by the pharmacy fulfilment device 112. In some embodiments, the order processing device 114 may be an external device separate from the pharmacy and communicate with other devices located within the pharmacy.

For example, the external order processing device 114 may communicate with an internal order processing device 114 and/or other devices located within the system 100. In some embodiments, the external order processing device 114 may have limited functionality (e.g., as operated by a patient requesting fulfillment of a prescription drug), while the internal pharmacy order processing device 114 may have greater functionality (e.g., as operated by a pharmacist).

The order processing device 114 may track the prescription order as it is fulfilled by the pharmacy fulfillment device 112. The prescription order may include one or more than one prescription drugs to be filled by the pharmacy. The order processing device 114 may make pharmacy routing decisions and/or order consolidation decisions for the particular prescription order. The pharmacy routing decisions may include what device(s) in the pharmacy are responsible for filling or otherwise handling certain portions of the prescription order. The order consolidation decisions include whether portions of one prescription order or multiple prescription orders should be shipped together for a patient or a patient family. The order processing device 114 may also track and/or schedule literature or paperwork associated with each prescription order or multiple prescription orders that are being shipped together.

The pharmacy management device 116 may enable and/or facilitate management and operations in a pharmacy. For example, the pharmacy management device 116 may provide functionality to enable receipt and processing of prescription drug claims, management of pharmacy personnel, management of pharmaceutical and non-pharmaceutical products, track products in the pharmacy, record workplace incidents involve personnel and products, and the like. In some embodiments, the order processing device 114 may operate in combination with the pharmacy management device 116.

In some embodiments, the pharmacy management device 116 may be a device associated with a retail pharmacy location (e.g., exclusive pharmacy location, a grocery store with a retail pharmacy, or a general sales store with a retail pharmacy) or other type of pharmacy location at which a member attempts to obtain a prescription. The pharmacy management device 116 may be utilized by the pharmacy to submit the claim to the PBM (e.g., through the benefit management device 102) for adjudication.

In some embodiments, the pharmacy management device 116 may enable information exchange between the pharmacy and the PBM, for example, to allow the sharing of member information such as drug history, and the like, that may allow the pharmacy to better service a member (e.g., by providing more informed therapy consultation and drug interaction information, etc.). In some embodiments, the benefit manager 102 may track prescription drug fulfillment and/or other information for patients that are not members or have not identified themselves as members, at the time (or in conjunction with the time) in which they seek to have a prescription filled at a pharmacy.

The pharmacy fulfillment devices 112, the order processing device, and/or the pharmacy management device 116 may include circuitry, a processor, a memory to store data and instructions, and communication functionality. These devices 112-116, in some embodiments are dedicated to performing processes, methods and/or instructions described herein. Other types of electronic devices specifically configured to implement with the processes, methods and/or instructions described herein may also be used. The pharmacy fulfillment device 112 may include the medication tracking system for tracking medications within a pharmacy as discussed in further detail below.

In some embodiments, at least some functionality of the order processing device 114 may be included in the pharmacy management device 116 may include circuitry, a processor, a memory to store data and instructions, and communication functionality. These devices 112-116, in some embodiments, are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (e.g., by utilizing a local storage) and/or through the network 104 (e.g., by utilizing a cloud configuration or software as a service, etc.) with the storage 110.

The user device 108 is used by a device operator. The device operator may be a user (e.g., an employee, a contractor, a benefit member, a patient of the pharmacy, or the like) associated with the system 100. Other device operators may also operate the user device 108. In some embodiments, the user device 108 may enable the device operator to attend to pharmacy operations in a convenient manner (e.g., remote from a pharmacy). In some embodiments, the user device 108 may enable the device operator to receive information about pharmacy processes, prescription drug fulfillment status, and the like.

The user device 108 may be a stand-alone device that solely provides at least some of the functionality of the methods and systems, or may be a multi-use device that has functionality outside of the methods and systems described herein. However, when the circuitry is loaded with instructions to perform tasks associated with the methods and systems described herein it is a dedicated computing machine.

The storage device 110 may include: a non-transitory storage (e.g., memory, hard disk, CD-ROM, and the like) in communication with the benefit manager device 102, the pharmacy device 106, and/or the user device 108 directly and/or over the network 104. The non-transitory storage may store order data 118, member 120, claims data 122, drug data 124, prescription data 126, and/or plan sponsor 128. Further, the system 100 may include additional devices, which may communicate with each other directly or over the network 104.

The order data 118 may be related to a prescription order. The order data may include the type of the prescription drug (e.g., drug name and strength) and quantity of the prescription drug. The order data 118 may also include data used for completion of the prescription, such as prescription materials and/or the type and/or size of container in which the drug is dispensed or in which is requested to be dispensed. In general, prescription materials include an electronic copy of information regarding the prescription drug for inclusion with or otherwise provided (e.g., via email) in conjunction with the fulfilled prescription. The prescription materials may include electronic information regarding drug interaction warnings, recommended usage possible side effects, expiration date, date of prescribing, or the like. The order data 118 may be used by the pharmacy to fulfill a pharmacy order. The present system will account for the quantity of drug in the automated dispenser. If the quantity of drug will not fulfill the present order or the entirety of orders for the same drug being assigned to be dispensed from a selected dispenser, the system will trigger a refill instruction. Such a refill instruction may include the location of a specific refill container.

In some embodiments, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (e.g., a prescription bottle and sealing lid, prescription packaging, and the like) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information, such as bar code data read from pallets, bins, trays, carts, and the like used to facilitate transportation of prescriptions within the pharmacy may also be stored as order data 118.

The member data 120 includes information regarding the members associated with the PBM. The information stored as member data 120 may include personal information, personal health information, protected health information, fitness data, health data, web and mobile app activity, and the like. Examples of the member data 120 include name, address, telephone number, e-mail address, prescription drug history, and the like. The member data 120 may include a plan sponsor identifier that identifies the plan sponsor associated with the member and/or a member identifier that identifies the member to the plan sponsor. The member data 120 may also include, by way of example, dispensation preferences such as type of label, type of cap, message preferences, language preferences, or the like.

The member data 120 may be accessed by various devices in the pharmacy to obtain information utilized for fulfillment and shipping of prescription orders. In some embodiments, an external order processing device 114 operated by or on behalf of a member may have access to at least a portion of the member data 120 for review, verification, or other purposes.

In some embodiments, the member data 120 may include information for persons who are patients of the pharmacy but are not members in a pharmacy benefit plan being provided by the PBM. For example, these patients may obtain drugs directly from the pharmacy, through a private label service offered by the pharmacy, or otherwise. In general, the use of the terms member (e.g., of a prescription drug benefit plan) and patient (e.g., of a pharmacy) may be used interchangeably in this disclosure.

The claims data 122 includes information regarding pharmacy claims adjusted by the PBM under a drug benefit program provided by the PBM for one, or more than one, plan sponsor. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility, and the like. Additional information may be included.

In some embodiments, other types of claims beyond prescription drug claims may be stored in the claims data 122. For example, medical claims, dental claims, wellness claims, or other types of health care-related claims for members may be stored as a portion of the claims data.

In some embodiments, the claims data 122 includes claims that identify the members with whom the claims are associated. In some embodiments, the claims data 122 includes claims that have been de-identified (e.g., associated with a unique identifier but not with a particular, identifiable member), aggregated, and/or otherwise processed.

The drug data 124 may include drug name (e.g., technical name and/or common name), other names by which the drug is known by, active ingredients, an image of the drug (e.g., in pill form), and the like. The drug data 124 may include information associated with a single medication or multiple medications.

The prescription data 126 may include information regarding prescriptions that may be issued by prescribers on behalf of patients, who may be members of the pharmacy benefit plan, for example to be filled by a pharmacy. Examples of the prescription data 126 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, and the like.

Figure 2:
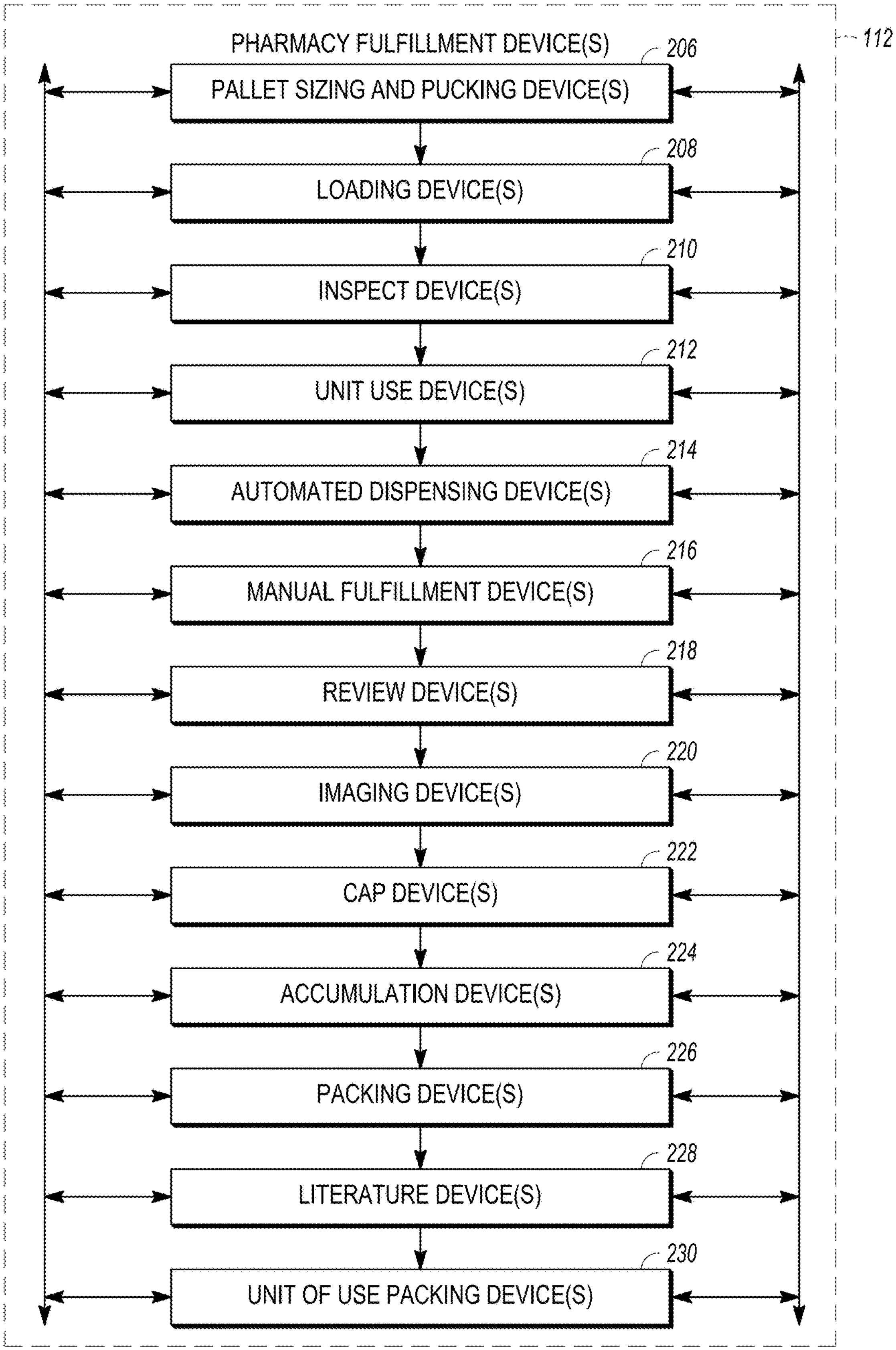
FIG. 2 is a block diagram of an example order processing device that may be deployed within the system of FIG. 1.

FIG. 2 illustrates the pharmacy fulfillment device 112, according to an example embodiment. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device, the order processing device 114, and/or the non-transitory storage 110, directly or over the network 104. Specifically, the pharmacy fulfillment device 112 may include pallet sizing and pucking device(s); loading device(s) 208; inspect device(s) 210, unit of use device(s) 212, automated dispensing device(s) 214, manual fulfillment device(s) 216, review device(s) 218, imaging device(s) 220, cap device(s) 222, accumulation device(s) 224, literature device(s) 228, packing device(s) 226, and unit of use packing device(s) 230. Further, the pharmacy fulfillment device 112 may include additional devices, which may communicate with each other directly or over the network 104.

In some embodiments, operations performed by one or more of these devices 206-230 may be performed sequentially, or in parallel with the operations of devices as may be coordinated by the order processing device 114. In some embodiments, the order processing device 114 tracks a prescription with the pharmacy based on operations performed by one or more than one of the devices 206-230.

In some embodiments, the pharmacy fulfillment device 112 may transport prescription drug containers, for example, between more than one of the devices 206-230 in a high volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism, or the like. In one embodiment, the loading device 208 has robotic arms or pickers to grasp a prescription container and move it to and from a pallet or to and from a puck. The loading device may also print a label that is appropriate for a container that is to be loaded onto the pallet and apply the label to the container. The pallet may be located on a conveyor assembly during these operations (e.g., at the high-volume fulfillment center or the like).

The inspect device 210 may verify that containers in a pallet are correctly labeled and in the correct spot on the pallet. The inspect device 210 may scan the label on one or more than one container on the pallet. Labels of containers may be scanned or imaged in full or in part by the inspect device 210. Such imaging may occur after the container has been lifted out of its puck by a robotic arm, picker, or the like, or may be otherwise scanned or imaged while retained in the puck. In some embodiments, images and/or video captured by the inspect device may be stored in the storage device as a portion of the order data 118.

The unit of use device 212 may temporarily store, monitor, label, and/or dispense unit of use products. In general, unit of use products are prescription drug products that may be delivered to a patient or member without being repackaged at the pharmacy. These products may include pills in a container, pills in a blister pack, inhalers, liquids in a spray or other dispensing container, and the like. Prescription drug products dispensed by the unit of use device 212 may be packaged individually or collectively for shipping, or may be shipped in combination with other prescription drugs dispensed by other devices (e.g., in the high volume fulfillment center).

At least some of the operations of the devices 206-230 may be directed by the other processing device 114. For example, the manual fulfillment device 216, the review device 218, the automated dispensing device 214, the packing device 226, and/or another device may receive instructions provided by the order processing device.

The automated dispensing device 214 may include one or more than one device that dispenses prescription drugs or pharmaceuticals into prescription containers in accordance with one or multiple prescription orders. In general, the automated dispensing device 214 may include mechanical and electronic components with, in some embodiments, software and/or logic to facilitate pharmaceutical dispensing that would otherwise be performed in a manual fashion by a pharmacist and/or pharmacist technician. For example, the automated dispensing device 214 may include high volume fillers (HVFs) that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center. As discussed in further detail below, the medication tracking system of the subject disclosure may be utilized to refill the automated dispensing devices 214 as the pills contained therein are supplied to respective medication containers. In other words, as a cell in one of the HVFs runs low on its medications, the medication tracking system can be utilized by a technician to quickly and accurately refill the cell with the correct medication.

The manual fulfillment device 216 may provide for manual fulfillment of prescriptions. For example, the manual fulfillment device 216 may receive or obtain a container and enable fulfillment of the container by a pharmacist or pharmacy technician. In some embodiments, the manual fulfillment device 216 provides the filled container to another device in the pharmacy fulfillment devices 112 to be joined with other containers in a prescription order for a patient or member. In general, a manual fulfillment may include operations at least partially performed by a pharmacist or a pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter or the like). Prescription drugs dispensed by the manual fulfillment device 216 may be packaged individually or collectively for shipping or may be shipped in combination with other prescription drugs dispensed by other devices in the high-volume fulfillment center. As discussed in further detail below, the medication tracking system of the subject disclosure may be utilized to refill the manual dispensing device 216 as the pills contained therein are supplied to respective medication containers. In other words, when a pharmacist or pharmacy technician runs low on medications that are being filled into containers, the medication tracking system of the subject disclosure can be utilized to bring the pharmacist more of the correct medication in a quick and accurate manner.

The review device 218 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like. In an example embodiment, the manual review may be performed at the manual station.

The imaging device 220 may image containers prior to filling and/or after they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114, and/or stored in the storage device 110 as part of the order data 118.

The cap device 222 may be used to cap or otherwise seal a prescription container. In some embodiments, the cap device 222 may secure a prescription container with a type of cap in accordance with a patient preference (e.g., a preference regarding child resistance, a preference regarding built-in adherence functionality, or the like), a plan sponsor preference, a prescriber preference, or the like. The cap device 222 may also etch a message into the cap or otherwise associate a message into the cap, although this process may be performed by a different device in the high-volume fulfillment center.

The accumulation device 224 accumulates various containers of prescription devices in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218, at the high-volume fulfillment center. The accumulation device 224 may be used to group the prescription containers prior to shipment to the member or otherwise.

The literature device 228 prints, or otherwise generates, literature to include with prescription drug orders. The literature may be printed on multiple sheets of substrates, such as paper, coated paper, printable polymers, or combinations thereof. The literature printed by the literature device 228 may include information required to accompany the prescription drugs included in a prescription order, relating to prescription drugs in the order, financial information associated with the order (e.g., an invoice or an account statement, or the like).

In some embodiments, the literature device 228 folds or otherwise prepares the literature for inclusion with a prescription drug order (e.g., in a shipping container or the like). In some embodiments, the literature device 228 that prints the literature may be separate from the literature device that prepares the literature for inclusion with a prescription order. The packing device 226 packages a prescription order in preparation for shipping the order. The packing device 226 may box, bag, or otherwise package the fulfilled prescription order for delivery. The packing device 226 may be a wrap seal device. A wrap seal device deployed as the packing device 226 may be a wrap seal device. A wrap seal device deployed as the packing device 226 may pause before an index; during the pause, one or more bottle, envelope or literature items have been placed within a vacuum pocket of the wrap seal device. After any bottle, envelope, or literature items have been placed in the pocket, the wrap seal device may index; specifically, the vacuum pocket may move forward. In an example embodiment, the forward movement is about the length of a bag (for example, between about 16 and 20 inches).

The packing device 226 may further place inserts (e.g., literature or other papers) into the packaging received from the literature device 228 or otherwise. For example, bulk prescription orders may be shipped in a box, while other prescription orders may be shipped in a bag which may be a wrap seal bag. The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, sort by zip code, or the like). The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, sort by zip code, or the like). The packing device 226 may include ice or temperature sensitive elements for prescriptions which are to be kept within a temperature range during shipping in order to retain efficacy or otherwise. The ultimate package may then be shipped through postal mail, through a mail order delivery service that ships via ground and/or air (e.g., UPS®, FedEx®, or DHL®, or the like), through delivery service, through a local delivery service (e.g., a courier service), through a locker box at a shipping site (e.g., an Amazon® locker, library locker, a post office box, or the like) or otherwise.

The unit of use packing device 230 packages a unit of use prescription order in preparation for shipping the order.

The pharmacy fulfillment device 112 in FIG. 2 may include single devices 206-230 or multiple devices 206-230 (e.g., depending upon implementation in a pharmacy). The devices 206-230 may be the same type or model of device or may be different device types or models. When multiple devices are present, the multiple devices may be of the same device type or models or may be a different device type or model. The types of devices 206-230 shown in FIG. 2 are example devices. In other configurations of the system 100, lesser, additional, or different types of devices may be included.

Moreover, multiple devices may share processing and/or memory resources. The devices 206-230 may be located in the same area or in different locations. For example, the devices 206-230 may be located in a building or a set of adjoining buildings. The devices 206-230 may be interconnected (e.g., by conveyors), networked, and/or otherwise in contact with one another or integrated with one another (e.g., at the high-volume fulfillment center). In addition, the functionality of a device may be split among a number of discrete devices and/or combined with other devices.

Figure 3:
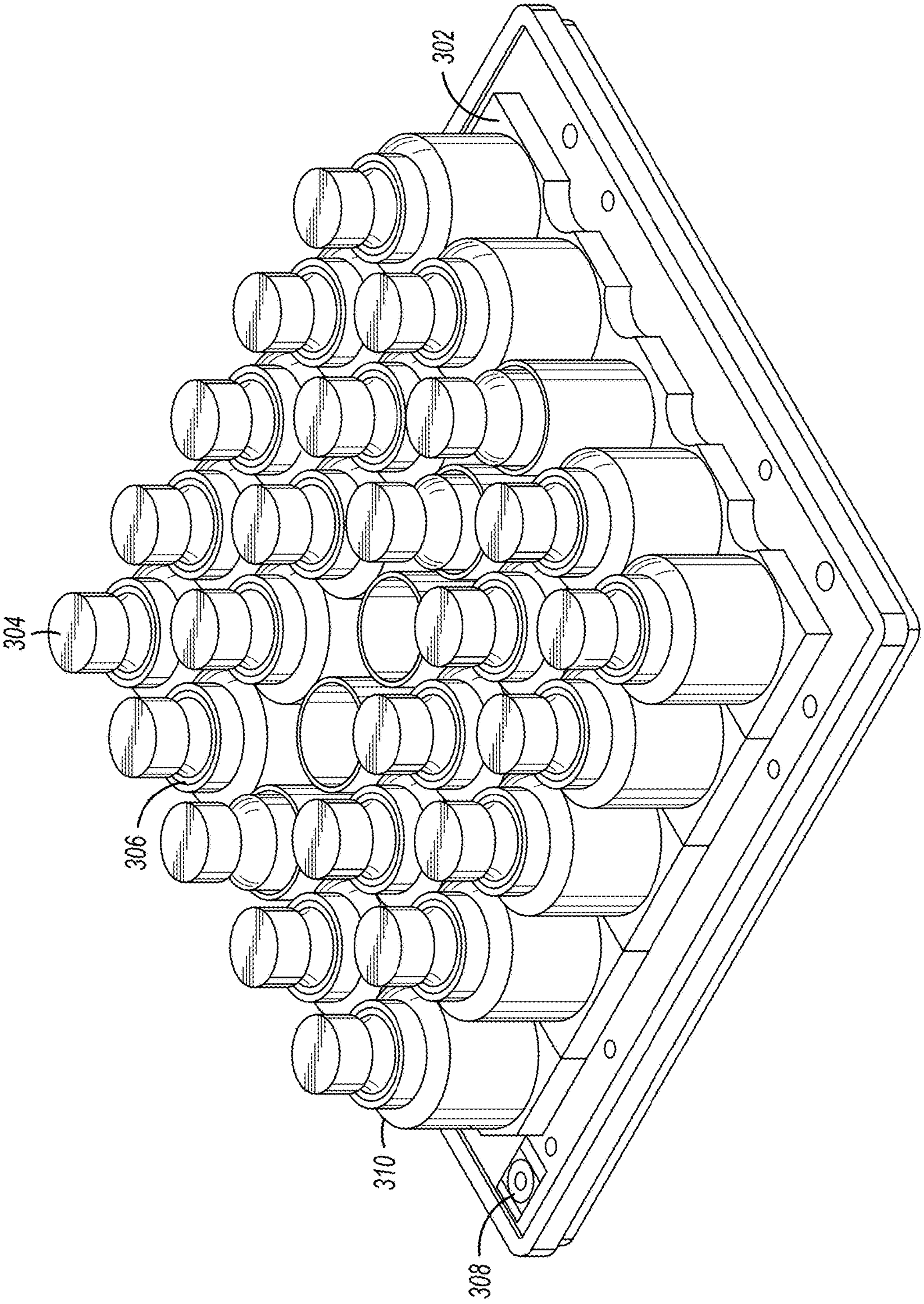
FIG. 3 is a top, perspective view of a pallet that may be deployed within the system of FIG. 1 according to an example embodiment.

FIG. 3 illustrates a pallet 302, according to an example embodiment, which may be used in the pharmacy fulfillment device 112 of the system 100 of FIG. 1. The pallet 302 may be a transport structure for a number of prescription containers 304, and may include a number of cavities 306. While the pallet 302 is shown to include 25 cavities in a five-by-five cavity row/column configuration, other numbers of categories and/or cavity configurations of varying shapes, sizes, and/or dimensions may be used. In some embodiments, the pallet 302 may be substantially square and, in such an embodiment, have a width and length of between approximately 18 inches and 22 inches (e.g., approximately 18 inches, 19 inches, 20 inches, 21 inches, or 22 inches). In some embodiments, the width and/or length may be greater than approximately 22 inches or less than approximately 18 inches.

In an example embodiment, the cavities 306 are spaced on the pallet 302 such that the center point of adjacent cavities 306 is approximately 3 and 4 inches (e.g., approximately 3 inches, 3.25 inches, 3.5 inches, 3.75 inches, or 4 inches). In another example embodiment, the distance between center points of adjacent cavities 306 is more than approximately 4 inches. In yet another example embodiment, the center points of cavities 306 are less than approximately 3 inches apart.

The pallet 302 may be made in whole or in part of metal, such as aluminum. Other suitable materials may be used for the pallet 302, such as plastic. The pallet 302 may be rigid so that the cavities remain in a known location that can be tracked while the pallet 302 moves through the system 100. The pallet 302 may include bumpers.

In some embodiments, other carriers beyond the pallet 302 and/or no carrier may be used to move containers or groups of containers through the system 100.

The pallet 302 may retain one or more than one container 304. A container 304 is generally cylindrical and may be one or a variety of sizes utilized by a pharmacy for fulfillment of a prescription. For example, a pharmacy may have two different sized containers or three different sized containers. Any number of different sized containers may be used with the pallet 302. While the container 304 is generally denoted as being used with the pallet 302, the containers 304 may otherwise be used in the system 100 or in a different system. Shapes beyond cylindrical shapes may be used for the containers 304. Examples of other shapes include regular prisms, elliptical cylinders, and combinations thereof. The receptacle of a puck may be sized to receive and support the outer shape of the container. The containers 304 may be disposed in the pallet 302 such that they are close to one another but do not touch.

The pallet 302 may include a radio-frequency identification (RFID) tag 308. The RFID tag 308 may be an active RFID tag, such as an active RFID tag with a close reading range. In some embodiments, the RFID tag 308 is an active, narrowband, read/write RFID tag.

The RFID tag 308 of a particular pallet 302 may store data (or otherwise facilitate the access of data, e.g., from the database 108) associated with the containers 304 that have been, are, and/or will be placed within the pallet 302, such as the order data, the claims data, the drug data, the prescription data, and/or the plan sponsor data associated with such containers. Other data may be stored by and/or associated with the RFID tag 314, such as the age of the pallet 302, the number of times the pallet 302 has been used to transport containers 304 through the system 100, the number of errors associated with the pallet 302, and the like. The RFID tag 314 may also store the position of individual containers on the pallet 302. In an example embodiment, the RFID tag 308 of the pallet 302, while deployed within an automated dispensing device 214, stores data associated with one or more of the following data fields: (1) container identifiers, (2) identifier of the particular automated dispensing device 214, (3) identifiers of the particular cells from which a particular container will be filled (as described below), (4) container properties (e.g., the status of containers 304 on the pallet 302, such as whether the containers 304 have passed an inspection station and have been identified as containers 304 to be filled in the particular automated dispensing device 214), and (5) the pallet route within the automated dispensing device 214.

The pucks 310 may be used to modify the size of the cavities 306 to allow the pallet 302 to accommodate different sizes of the containers 304.

Figure 4:
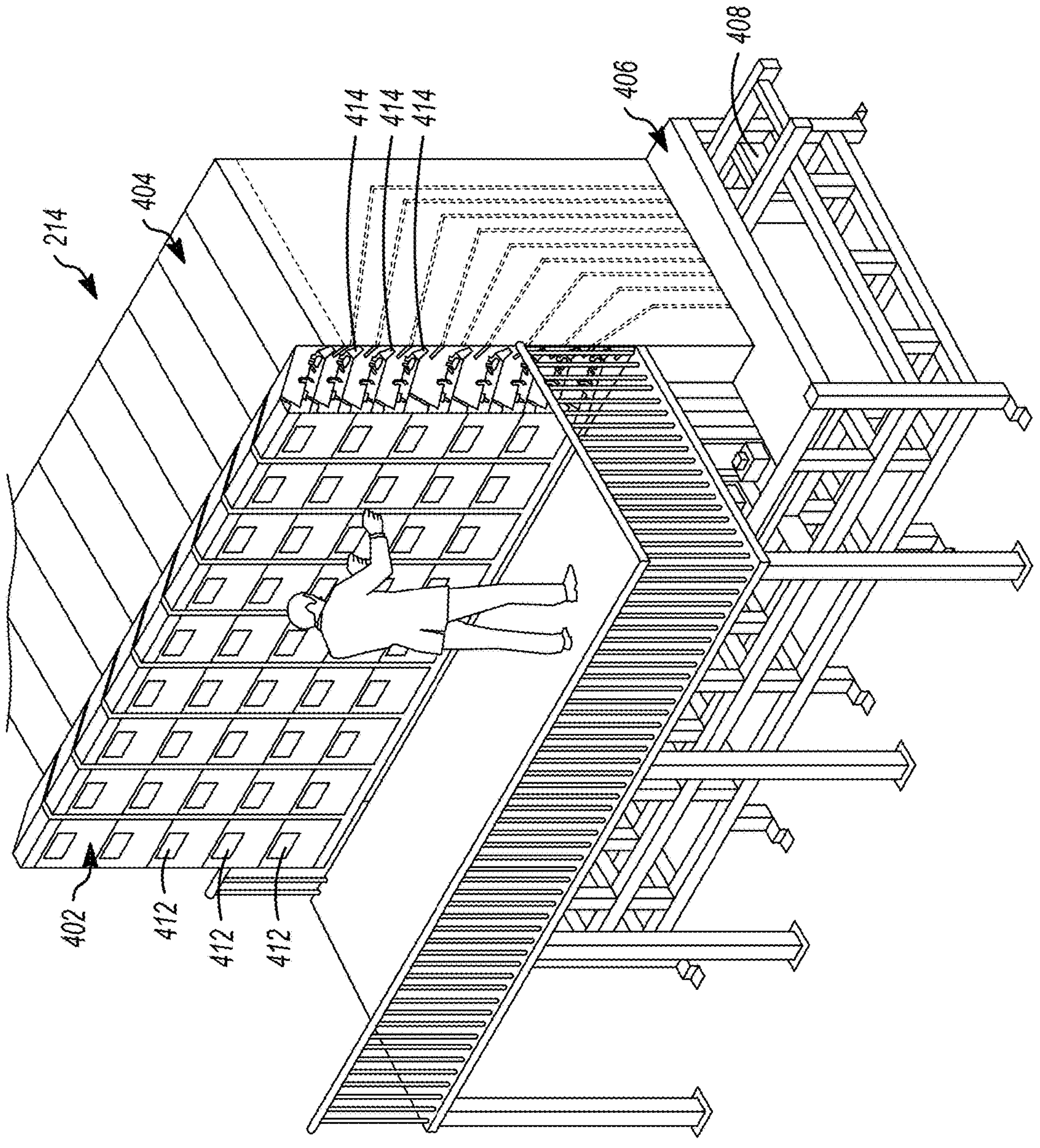
FIG. 4 is a perspective view of an automated dispensing device that may be deployed within the system of FIG. 1 according to an example embodiment.

FIG. 4 illustrates an example embodiment of the automated dispensing device 214, or HVF. The HVF 214 enables dispensing of a number of different types of pills in an automated or semiautomatic manner. It should be appreciated that the term "pill" as used herein includes a range of different types of solid medications (such as tablets, gel caps, capsules or the like, i.e., non-liquid medicines) or non-solid medications that are disposed in containers or non-solid medications that are disposed in containers (such as single use eye drop containers or other single use liquid medications) or other items to be dispensed. The non-solid medications can be individual doses of medication that are contained within objects that are externally solid.

Figure 7:
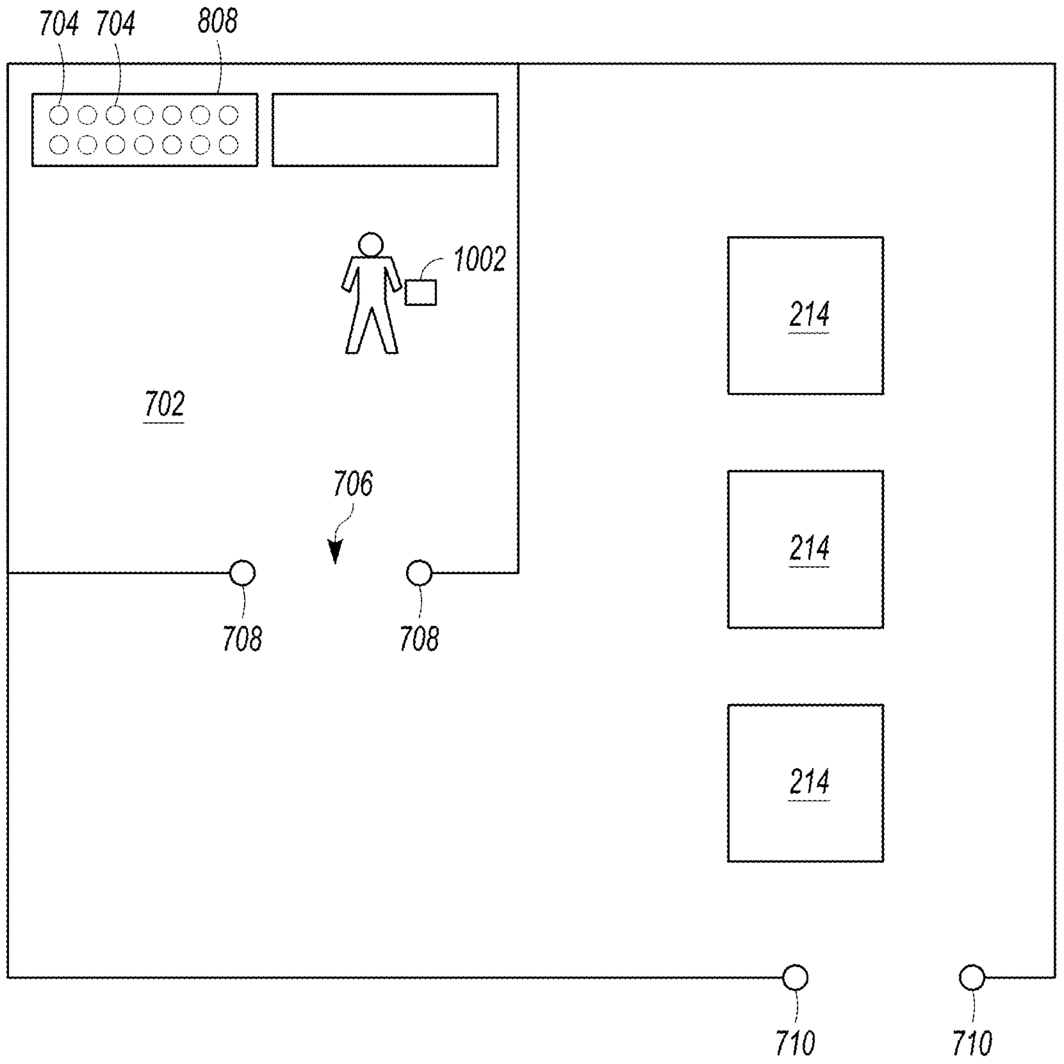
FIG. 7 is an example floor plan of a portion of a high volume pharmacy according to an example embodiment of the present disclosure.

The automated dispensing device 214 includes a filling cabinet 402, a prefill assembly 404, and a pallet system 406, which includes a pallet conveyor 408 (also known as a conveyor assembly). The filling cabinet 402 stores pharmaceuticals to be dispensed into containers 304 via the prefill assembly 404 and dispenses measured quantities of pharmaceuticals into the prefill assembly 404. The prefill assembly 404 stores the measured quantities of pharmaceuticals 410 and dispenses the measured quantities of pharmaceuticals 410 received from the filling cabinet 402 into containers 304 on the pallet 302 while the pallet 302 is positioned in the pallet system 406. In the exemplary embodiment, the filling cabinet 402 includes multiple cells 412 arranged in a grid-like pattern with a plurality of columns and a plurality of rows. Specifically, in the exemplary embodiment, the filling cabinet 402 has ten (10) columns and nine (9) rows for a total of ninety cells 412. In some embodiments, the filling cabinet 402 has either more or fewer rows and/or columns of cells 412. The various cells 412 may each be adapted to similar or different pharmaceuticals 410, e.g., pills or capsules. For example, in some embodiments, a commonly prescribed pharmaceutical 410 may occupy more than one cell 412. The cells 412 are be adapted to receive inserts 414 which can hold the pharmaceuticals 410 then automatically dispense the pharmaceuticals 410 into the prefill assembly 404. In the exemplary embodiment, the inserts 414 can be pulled out of the cells 412 like drawers. In other embodiments, the inserts 414 may be permanently located in the cells 412. In some embodiments, two opposing filing cabinets 402 and two opposing prefill assemblies 404 may be positioned over the same pallet system 404. A medication filling area 700 (see FIG. 7) may include a plurality of these HVFs 214 that may contain similar or different types of pills. For example, three HVFs 214 are illustrated in the example of FIG. 7. However, it should be appreciated that the medication filling area could include more or fewer than three HVFs.

Figure 5:
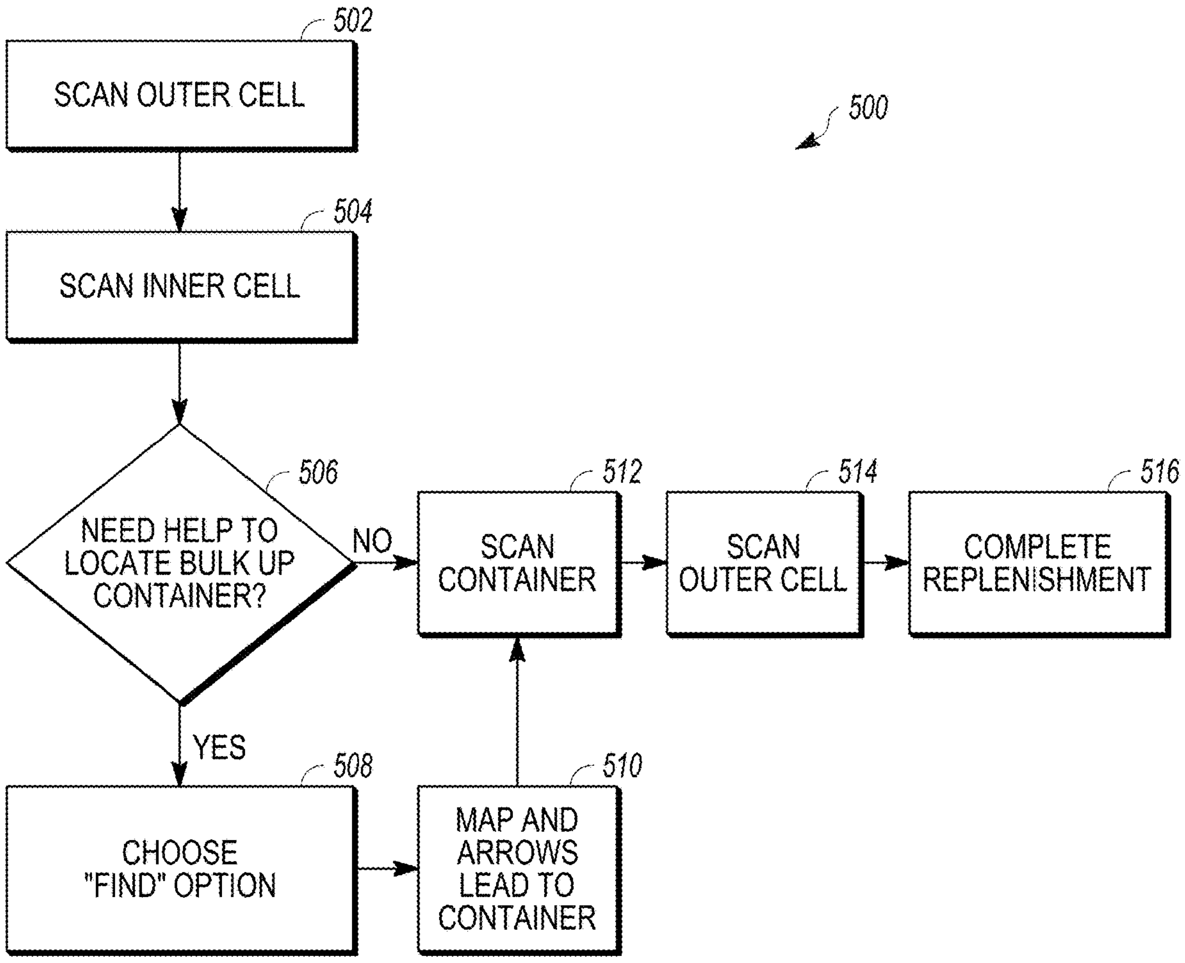
FIG. 5 is a flow chart of a process of refilling a cell in the automated dispensing device of FIG. 4 according to an example embodiment of the present disclosure.
Figure 10:
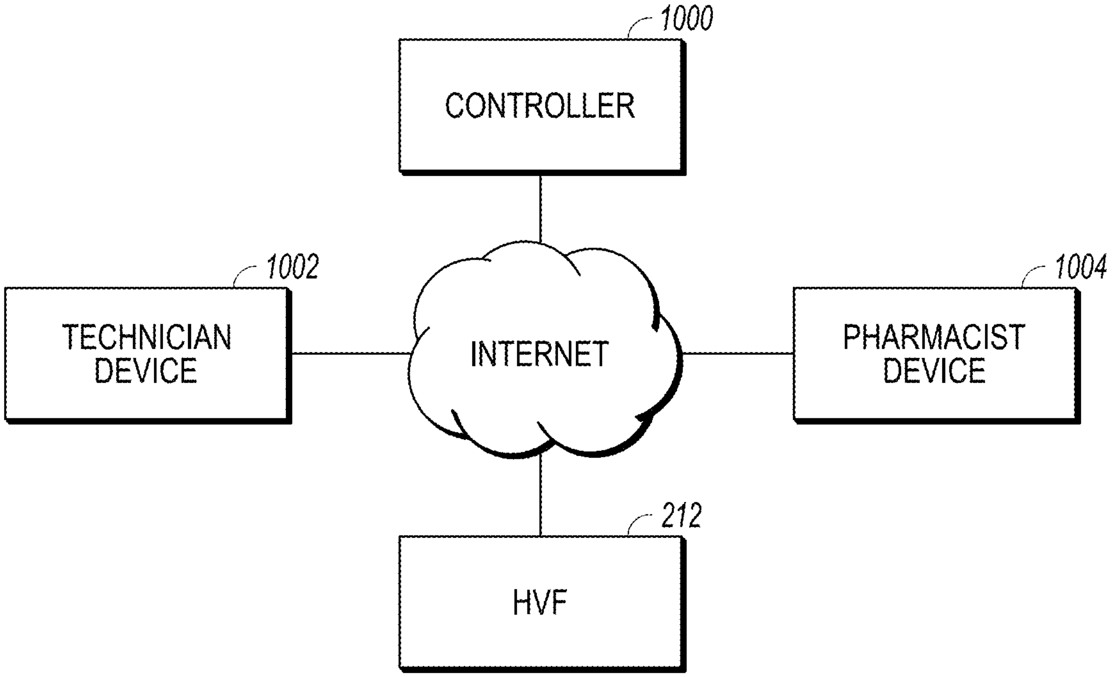
FIG. 10 is a schematic view of the interaction between various components of the system of FIG. 1.

Periodically, the cells 412 in the HVFs 214 have to be refilled or replenished when they run low on pills to dispense. Generally, this process involves a controller 1000 (illustrated schematically in FIG. 10 and in some embodiments being a server that is part of the pharmacy fulfillment device 112) continuously monitoring the quantities of pills in the various cells of the HVFs 214 and also monitoring future demand for those pills. When the controller 1000 detects that a pill supply (e.g., quantity, number, or count) in one of the cells falls below a set threshold (which can be predetermined), the controller 1000 automatically sends a notification to a technician device 1002, which controlled by software and is in electrical communication with the controller 1000 and is operated by a technician who is physically present at the medication filling area 700 with the HVFs 214. The controller 1000 communicates data containing instructions to the technician device 1002, which can show those instructions to the technician on a display. With reference now to the flow chart 500 of FIG. 5, the technician device 1002 displays the instructions to the technician as to which cell in which HVF 214 needs to be refilled and what type of pills are located in that cell. The cell that needs to be or is being refilled is hereinafter referred to as the "selected cell." At step 502, the technician physically goes to the selected cell while the technician device 1002 tracks the location. When at the selected cell, the technician device 1002 scans, with an imager or other code reader, a label on an outer cell door of the selected cell. For example, the label on the outer cell door can include a bar code, a quick response (QR) code, or any suitable type of machine readable code that can be scanned or otherwise read by the technician device 1002. This will uniquely identify the cell and the items it contains. At step 504, the outer cell door is opened, e.g., by the technician or remotely upon instruction by the controller 1000. The interior of the cell, e.g., on the inner face of the cell door, includes a further machine readable identification label with a code (e.g., a bar code or a QR code). The technician device 1002 scans a label on inside the cell, or the cell door. The technician device 1002 transmits the cell identifying data to the controller 1000, in an example.

If the controller 1000 confirms that the technician device 1002 has scanned the correct inner wall and outer wall of the cell doors, then the technician leaves the HVF 214 and goes to a bulk and prep area 702 (illustrated in FIG. 7 and discussed in further detail below) and attempts to locate an appropriate bulk up container 704 that contain the same pills as the selected cell. At decision step 506, the controller determines if the technician needs assistance in locating the correct bulk up container 704 by way of an input from the technician on the technician device 1002, i.e., the technician device 1002 can display a query for if the technician needs assistance with a selectable option that the technician can select to receive assistance. Also, where the technician scans an incorrect container 704, the controller can automatically determine that the scan was the incorrect container 704 and guide the technician to the correct container 704.

Figure 6:
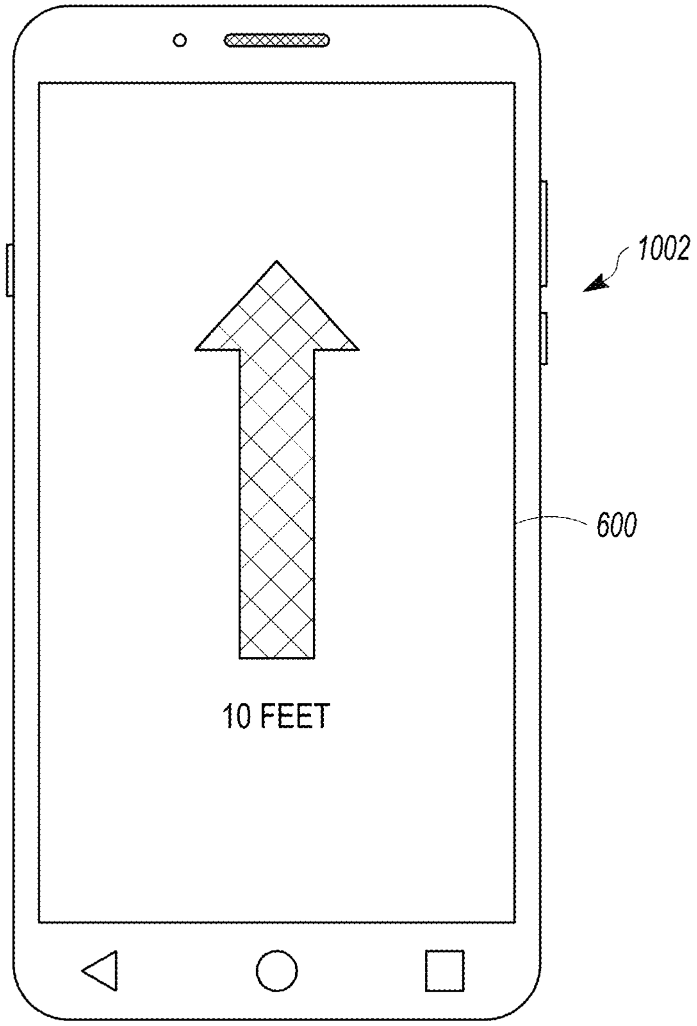
FIG. 6 is a front elevation view of an example technician device with a graphical user interface that is directing a technician to a missing bulk up container.

If the answer at decision step 506 is "yes," then at step 508, the technician chooses the "find" option on the technician device 1002. At step 510, the technician device 1002 displays indicia to indicate location of the bulk up container and direction indicia to guide the technician directly to the correct bulk up container. In an example embodiment, the technician device has an integrated RFID sensor that can sense the location of a radio frequency identification (RFID) tag 800 (illustrated in FIG. 8 and discussed in further detail below) on the bulk up container 704. The technician device 1002 can then guide the technician to the bulk up container 704 with a map, one or more indicia (e.g., arrows), and a distance. More specifically, a map of the bulk up area and, optionally, additional areas of the pharmacy is either prestored in the technician device 1002 or may be communicated to the technician device 1002 by the controller 1000. The map may be displayed on the technician device 1002 in response to the user selecting the "find" option on the technician device 1002. The device can store a map of both the pharmacy area and the bulk up area, inclusive of storage structures, dispensing machines, aisles, pathways, and the like. For example, FIG. 6 is an example user interface 600 on the technician device 1002 that can guide a technician to the bulk up container that the technician is searching for. In an example embodiment, the user interface 600 on a display of the device 1002 can also display the aisle, shelf and location on the shelf. FIG. 7 illustrates a technician 750 using the technician device 1002 to locate a bulk up container 704. The sensed direction can locate the correct bulk up container 704 in three dimensions and can overlay the sensed location of the correct bulk up container 704 on the map.

In one embodiment, a plurality of RFID scanners 708 are positioned within or adjacent to the bulk and prep area 702 and continuously scan the bulk and prep area 702 to sense the RFID tag on each container 704 contained therein. The RFID scanners 708 communicate to the controller 1000, which maintains an inventory of the containers 704 in the bulk and prep area 702. The controller 1000 can also use the data from the multiple RFID scanners 708, which are spaced apart from one another, to triangulate the locations of the containers 704 in three dimensions for use in guiding the technician to a container 704 that is being sought via the display on the technician device 1002. In some embodiments, the inventory of the containers 704 in the bulk and prep area 702, including the three dimensional positions of the containers 704, can be established by a single moving RFID scanner that is carried by a technician or a moveable robot. For example, when a technician is searching for a particular container 704, by moving around the bulk and prep area 702 while the technician device 1002 takes distance measurements to the appropriate RFID tag 704, the technician device 1002 (with or without assistance from the controller 1000) can determine a location of the container 704 relative to the technician and project an arrow on the display of the technician device 1002 that points in the direction of the container 704 that is being sought.

Figure 9:
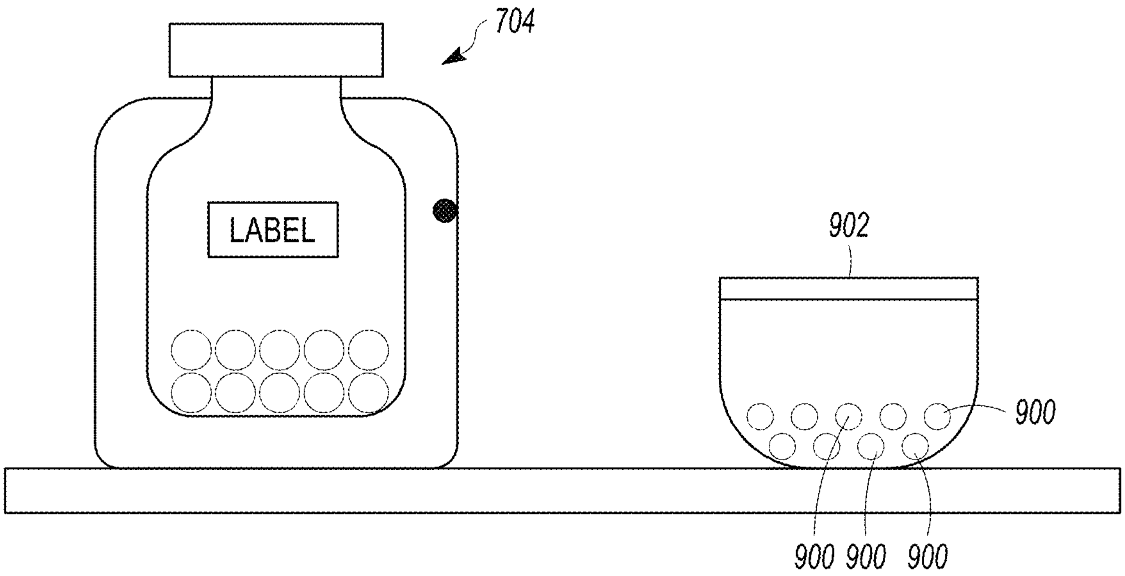
FIG. 9 is an example bulk up container adjacent a temporary container that contains pills for refilling one of the cells in the automatic dispensing device of FIG. 4.

If the answer at decision step 506 is "no," or following step 510, at step 512, the technician uses the technician device 1002 to scan a machine readable code, such as on a RFID tag, on the bulk up container. The controller 1000 verifies if the bulk up container 704 that was scanned by the technician device 1002 is the correct bulk up container 704 to refill the selected cell. If the verification process passes, the technician then manually transfers some of the pills 900 from the bulk up container 704 to a temporary container 902 (see FIG. 9), such as a clear bag. The technician may then capture images of both the bulk up container 704 and the pills 900 within the temporary container 902.

The technician then takes the temporary container 902 out of the bulk and prep area 702 and to the appropriate HVF 214. At step 514, the technician scans the label on the outer cell door of the selected cell with the technician device 1002. Then, all of the information that has been compiled by the technician device 1002 is sent to a pharmacist device 1004 that is controlled by a pharmacist. The pharmacist device 1004 shows drug and container data on a display for the pharmacist to review the data from the entire process, including the scans of the cell doors and the images of the bulk up container 704 and the temporary container 902 and confirms if everything is correct. In an example, the pharmacist device 1007 can highlight potential errors in the scanned data and the expected data stored in the memory related to the container. The pharmacist can then remotely unlock the inner cell door of the selected cell through the pharmacist device 1004 and allow the technician to transfer the pills from the temporary container 902 into the selected cell at step 516. Thus, this process requires the technician and the pharmacist to work together as a team and with the assistance of the controller 1000 to ensure that only the correct pills 900 are inserted into the selected cell. This refilling process (except the portions pertaining to the RFID tags 800 on the bulk up containers 704) is discussed in further detail in U.S. Pat. No. 11,389,378, entitled "MEDICATION VERIFICATION METHOD AND SYSTEM," which is herein incorporated by reference.

Figure 8:
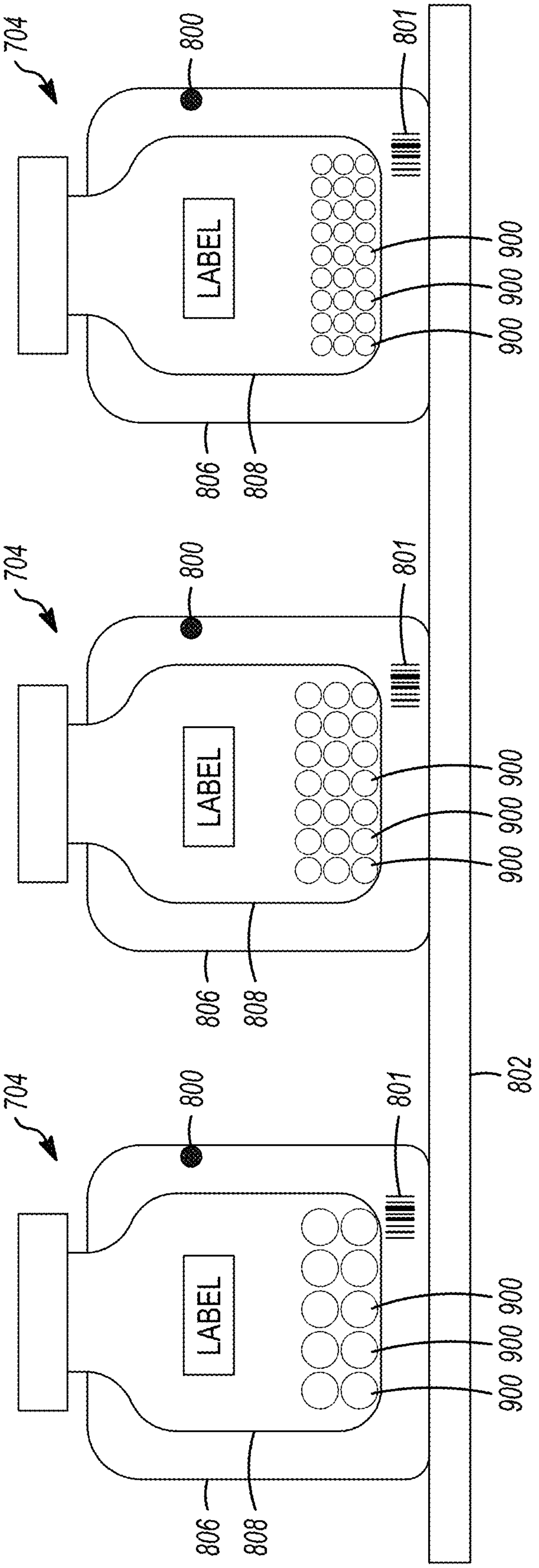
FIG. 8 is a shelf within a bulk and prep area of the high volume pharmacy and containing a plurality of bulk up containers.

Turning now to FIGS. 7 and 8, in the exemplary embodiment, the bulk and prep area 702 is located within the pharmacy near the medication filling area 700 with the HVFs 214 and includes a plurality of bulk up containers 704 that are stored on shelves 802. In the exemplary embodiment, each of the bulk up containers 704 includes a plastic shell 806 and a bag 808 disposed within the plastic shell 806, and the pills 900 are located within the bag 808. Each bulk up container 704 only includes a single type of pill 900, but the different bulk up containers 704 contain different types of pills 900. The RFID tag 800 is attached (e.g., bonded with) the plastic shell 806 of the bulk up container 704. In some embodiments, the RFID tag 800 can be attached with an inner wall of the plastic shell 806 and outside of the bag 808. Both the plastic shell 806 and the bag 808 are preferably made of a transparent material so that the contents of the bulk up container 704 are easily visible without having to remove a top from or otherwise open the bulk up container 704. In some embodiments, an optical code, such as a barcode 801 or a QR code, can also be included on the plastic shell 806 and contain data that is linked to the contents of the container 704. In some embodiments, the optical code could be a specific color that is linked in the controller or the technician device 1002 with data related to the contents of the container.

For many medications, there is a maximum amount of time that certain types of pills 900 can be stored in bulk up containers 704 prior to depositing the pills 900 into the final packaging (e.g., the prescription containers 304 illustrated in FIG. 3). More specifically, regulations and manufacturer limitations often govern the shelf life, or expiration dates, of medications when the medications are outside of packaging. In order to minimize waste, it is very important that the pills 900 in the bulk up containers 704 be used according to expiration date, i.e., the pills 900 with the soonest expiration must be deposited into the cells of the HVF 214 first. Accordingly, the bulk up containers 704 are preferably arranged on the shelves 808 such that the bulk up containers 704 containing the pills 900 with the soonest expiration dates for each type of pill 900 are arranged in the most easily accessible location for the technician, e.g., in front of the other bulk up containers 704 that include pills 900 of the same type and with later expiration dates. Additionally, due to the fact that the pills 900 can expire in the bulk up containers 704, it should be noted that even temporarily misplacing a bulk up container 704 can be very wasteful if that bulk up container 704 is not found promptly so that the pills 900 contained therein can be deposited into final packaging prior to their expiration date. Placing the RFID tags 800 on the bulk up containers 704 assists with reducing waste by improving the tracking of movement of the bulk up containers 704 within the bulk and prep area 702 so that no bulk up containers 704 are misplaced, even temporarily.

The bulk and prep area 702 is itself in a separate room from the medication filling room 700 with the HVFs 214 with only a single door or opening 706 between these spaces 700, 702. RFID sensors 708 or portals are located at the opening 706 for tracing the movement of the bulk up containers 704 into and out of the bulk and prep area 702 to ensure that bulk up containers 704 and the pills 900 contained therein are not lost or otherwise misplaced, even temporarily. In operation, as a bulk up container 704 passes through the opening 706, one or more of the RFID sensors 708 reads data contained in the RFID tag 800. The controller 100 can quickly process this data determine if the removal or insertion event was proper or improper, e.g., if the technician tried to remove a full or partially full bulk up container 704 from the bulk and prep area 702. In the event that an improper removal is detected, the controller 1000 can send a warning through a variety of means. For example, the controller 1000 can send an alert to one or more technician devices 1002 or can activate a visual and/or audible alarm that is located at the RFID sensor 708 that detected the improper movement event.

Bulk and prep areas 702 can include various systems to assist with the bulk up operations. Examples of bulk up systems are found in U.S. Pat. No. 11,505,355, which is hereby incorporated by reference.

These systems make it easier for a technician (or any user) to find a misplaced bulk up container 704 and reduces the need for IT support to track down missing bulk up containers 704 in the system. As discussed above, the technician device 1002 also may include an RFID sensor that can assist the technician in locating a bulk up container 704 within or outside of the bulk and prep area 702. In the exemplary embodiment, additional RFID sensors 710 are disposed at an exit of the medication filling area 700 as an added precaution to detect any improper movement of the bulk up containers 704 outside of the medication.

In some embodiments, at regular intervals, a technician can use the technician device 1002 to perform an inventory analysis by walking through the bulk and prep area 702 to wirelessly scan the RFID tags on all of the containers 704 in the bulk and prep area 702 and confirm their locations. The technician device 1002 can communicate this data to the controller 1000, which can compare the locations of the containers 704 to the expected locations of those containers 704. In some embodiments, the containers 704 are arranged in rows by medication type, and in each row, the containers 704 with the soonest expiration dates are positioned in front so those medications can be sent to the HVF first. If the controller 1000 determines that any of the containers 704 are out of place, then the controller 1000 can instruct the technician via the technician device 1002 where to move certain controllers 704 so that they all can be in the correct locations.

Because all of the bulk up containers 704 in the bulk and prep area 702 have RFID tags 800 on them, the technician device 1002 can also be used to periodically (for example, once per day) inventory the contents of the bulk and prep area 702. This is a further measure to reduce the risk of lost product. In some embodiments, RFID scanners can be permanently or semi-permanently installed in the bulk and prep area 702 to continuously maintain a live inventory of the bulk up containers 704 in the bulk and prep area 702.

In some of the embodiments described herein, the technician can be an automated device and/or some combination of a person and an automated device. The automated device can be a mobile robot that can perform the steps described above to retrieve the containers in the bulk and prep area and refill the cells of the HVF. The automated device can move around the pharmacy according to instructions that are provided to it by the controller. The technician device with the RFID scanner can be built into the automated device. The technician device, in other examples, is integrated into a an unmanned arial vehicle, drone, vehicle, or ambulatory robot.

In some embodiments, some of the steps or operations can be performed by a unmanned arial vehicle, e.g., a drone, that can carry the medications into and out of the bulk and prep area and to the HVFs. An example unmanned arial vehicle system are described in U.S. Patent Publication No. 2023/0153743, entitled "SYSTEM AND METHOD FOR SECURE DELIVERY OF A MEDICATION PACKAGE USING UNMANNED AERIAL VEHICLES" and U.S. Pat. No. 11,783,273, entitled "SYSTEM AND METHOD FOR RECEIVING AND DELIVERING A MEDICAL PACKAGE," both of which are herein incorporated by reference. The present systems and methods are adaptable to the use of unmanned arial vehicles as the location of the bulk up container can be tracked in three dimensions as it is moved within the facility, e.g., the pharmacy. The present disclosure can also inform the unmanned arial vehicle of the location of a bulk up container such that the unmanned arial vehicle can retrieve a specific bulk up container. Still further automated machines, e.g., unmanned arial vehicles, mobile or ambulatory robots, and the like, can travel with the facility to locate each bulk up container. Many embodiments described herein use a technician for moving the bulk up containers or locating the bulk up containers for ease of explanation, these embodiments can use automated machines in place of the technician. The electronics of the device for sensing can be integrated in the mobile, automated machines. The automated machines can have an articulated arm with an end of arm tooling that is configured to engage a bulk up container to lift it from a shelf or place the bulk up container on a shelf. The unmanned arial vehicle can have a gripper under its body that is configured to engage a bulk up container. The end of arm tooling or the gripper can have fingers that move apart and grip the outside of a bulk up container. The bulk up container is rigid enough such that the fingers can apply pressure to the outside of the bulk up container with sufficient force to secure the bulk up container in the fingers but not collapse of crush the side of the bulk up container.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the terms "controller" and "processor" should be understood as encompassing any of the foregoing hardware, either singly or in combination. The terms "signal" and "data" are used interchangeably.

As used herein, the term "tag," describes a communication structure that can be affixed to a container. The tag can be embedded into the container or can be attached with the container, for example, with an adhesive. The tag can be located either on an exterior of or within an interior of the container. For example, the tag can be placed on a bottom or a side wall of the container. The tag is packaged to be inert with respect to the medications contained within the container.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a special purpose computer/processor may be utilized which may contain hardware for carrying out any of the methods, algorithms, or instructions described herein. The hardware may become a special purpose device when storing instructions, loading instructions, or executing instructions for the methods and/or algorithms described herein.

Further, all or a portion of implementations of the present disclosure may take the form of a computer program product accessible from, for example, a computer-usable or computer-readable medium. The program includes steps to perform, at least, portions of the methods described herein. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method of operating a medication filling system, comprising the steps of:

providing a medication filling area that includes a plurality of automatic dispensing devices, at least one of the automatic dispensing devices having a plurality of cells containing different medications, providing a bulk and prep area that includes a plurality of bulk up containers that contain different medications that correspond with the medications within the plurality of cells of the plurality of automatic dispensing devices;

providing at least one wireless sensor between the bulk and prep area and the medication filling area;

receiving a notification on a technician device that a selected cell of the plurality of cells requires refilling with a selected medication;

transmitting a notification to a technician device that identifies the selected cell that requires refilling and also identifies a selected bulk up container that contains the selected medication;

receiving a signal from a wireless tag on the selected container that directs a technician using the technician device on a location of the selected bulk up container; and with the at least one wireless sensor, detecting an improper removal of at least one of the plurality of bulk up containers from the bulk and prep area.

2. The method as set forth in claim 1, further including the step of alerting the technician device in response to the detection of the improper removal of at least one of the plurality of bulk up containers from the bulk and prep area.

3. The method as set forth in claim 1, further including the step of transferring the selected medication from the selected bulk up container to a temporary container.

4. The method as set forth in claim 3, further including the step of removing the temporary container with the selected medication contained therein from the bulk and prep area while the selected bulk up container remains in the bulk and prep area.

5. The method as set forth in claim 4, further including the step of refilling the selected cell with the selected medication contained in the temporary container.

6. The method as set forth in claim 5, further including the step of alerting the technician device in response to the detection of the improper removal of at least one of the plurality of bulk up containers from the bulk and prep area.

7. The method as set forth in claim 6, wherein receiving a signal from a wireless tag on the selected container includes displaying on a technician device continuously updated directions to the selected bulk up container.

8. The method as set forth in claim 1, wherein at least one wireless sensor is positioned at every opening into the bulk and prep area.

9. The method as set forth in claim 1, wherein receiving a signal from a wireless tag on the selected container includes displaying a guide directing the technician device to the selected one of the bulk up containers.

10. The method as set forth in claim 1, wherein the plurality of different medications are a plurality of different types of pills.

11. The method as set forth in claim 1, wherein receiving a signal from a wireless tag on the selected container includes displaying on a technician device continuously updated directions to the selected bulk up container.

* * * * *